(12) United States Patent
Goral (10) Patent No.: US 7,221,505 B2
(45) Date of Patent: May 22, 2007

(54) PANORAMIC FIELD OF VIEW ACQUIRING AND DISPLAYING SYSTEM

(75) Inventor: Avihu Goral, D.N. Misgav (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 11/152,702

(22) Filed: Jun. 14, 2005

(65) Prior Publication Data

US 2006/0114556 A1   Jun. 1, 2006

(30) Foreign Application Priority Data

Jun. 14, 2004   (IL)   ................................. 162512

(51) Int. Cl.
G02B 23/00   (2006.01)
G02B 13/06   (2006.01)
H01J 3/14   (2006.01)

(52) U.S. Cl. .................. 359/399; 359/400; 359/419; 359/725; 250/235

(58) Field of Classification Search ........ 359/350–361, 359/399–420, 725–732; 348/36–50; 250/235
See application file for complete search history.

(56) References Cited

U.S. PATENT DOCUMENTS

| | | | | |
|---|---|---|---|---|
| 5,049,740 | A | * | 9/1991 | Pines et al. .................. 250/235 |
| 5,113,284 | A | * | 5/1992 | Stuhlinger .................. 359/419 |
| 5,317,394 | A | * | 5/1994 | Hale et al. ............. 348/207.99 |
| 5,418,364 | A |   | 5/1995 | Hale et al. .................. 250/344 |
| 5,485,306 | A | * | 1/1996 | Kiunke et al. .............. 359/419 |
| 5,657,073 | A | * | 8/1997 | Henley ......................... 348/38 |
| 6,195,204 | B1 | * | 2/2001 | Nalwa ......................... 359/403 |

* cited by examiner

Primary Examiner—Thong Q Nguyen
(74) Attorney, Agent, or Firm—Arent Fox LLP (57) ABSTRACT

A panoramic field of view acquiring system comprises three telescopes, which acquire three separate images, each typically covering a little over one third of the total required scene and a multiplexer, which is used to transmit the three images, one at a time, to an appropriate detector. Standard imaging techniques are then used to coordinate the images to form a complete picture and display them as required.

12 Claims, 6 Drawing Sheets

PANORAMIC FIELD OF VIEW ACQUIRING AND DISPLAYING SYSTEM

CROSS-REFERENCE TO RELATED APPLICATION

This application claims priority under 35 U.S.C. §119 to Israeli Patent Application No. 162512 filed Jun. 14, 2004, the entire specification claims and drawings of which are incorporated herewith by reference.

FIELD OF THE INVENTION

This invention relates to a method and system for obtaining panoramic views of geographical areas covering a typically complete horizontal field of view, i.e. 360° over some vertical angle. The invention particularly relates to a panoramic view system for providing discovery, alarm, and location of threats, which may come from any direction. Said panoramic views are intended for use and display in terrestrial situations, but may be used for taking wide, continuous pictures from a fast low flying aircraft.

BACKGROUND OF THE INVENTION

The art has developed systems for aircraft navigation and targeting purposes, particularly forward looking infrared (FLIR) line of sight systems. U.S. Pat. No. 5,049,740 discloses a system for obtaining images of two fields of view of one or two scenes with a radiation sensor by the use of a single detector and common signal processing circuitry. Said patent describes a field of view sensor providing a narrow view and a wide view by two independent telescopes, which are combined by use of a field of view switch comprising a chopper wheel or an optical switch in synchronized operation with a mirror scanner.

U.S. Pat. No. 5,418,364 discloses a FLIR system for providing both navigation and pilotage functions for which a wide field of view is provided, and a target acquisition or tracking/targeting function, for which a narrow field of view is provided. The wide field of view permits implementation of a pilotage function while the narrow, optionally magnified field of view, implements a targeting function. Both lines of sight are coupled in a single IR detector and two separate FLIR video image signals are generated using a single common processor, one for pilotage and one for targeting.

It is seen that the art provides systems for assisting an aircraft pilot in directing the aircraft and in finding and tracking a target. However, no matter what the width is of the wider of the two fields-of-view, it has a limited angular span and the presence of a narrow field of view, while useful for targeting, does not contribute to the inspection and analysis of the geographical area over which the aircraft flies. The two telescopes that are provided in said prior art have different functions and provide different information and do not complement one another.

It would therefore be desirable to provide a system that would permit acquiring and showing a complete panoramic picture of a relevant geographical area. It would also be desirable if such a system, which could provide discovery, alarming, and location of threats from any direction, could provide such a panoramic view by use of a singe detector. A singe detector system would have many advantages including reduced cost, volume, and weight, over multi detectors system. Examples of applications in which the usefulness of such a system is readily apparent are found in military operations. Typical threats that could be detected and their paths located include enemy missiles, rockets, and bullets, which can come from any direction. Artillery barrages and flight missions could be guided and followed by a system providing such a panoramic view, from a headquarters or forward station on the ground, from which instructions could be transmitted to the artillery unit on the ground or to an aircraft pilot in the air. As another example, the system of the invention can be mounted on an aircraft and could be directly used by the pilot in performing his mission.

It is therefore a purpose of this invention to provide such a system and to provide it by means of an optical system the components of which are known in the art and can be easily acquired, assembled, coordinated and controlled by persons expert in the optical art.

It is another purpose of this invention to provide a system that provides such panoramic views with a single detector.

Other purposes and advantages of the invention will appear as the description proceeds.

SUMMARY OF THE INVENTION

The system of the invention comprises three image-acquiring optical devices, hereinafter referred to as "telescopes" for brevity's sake. For land based systems, each telescope covers a typical field of view of about 120°, and the fields-of-view are so coordinated that the telescopes together cover a field of view of typically 360°. Means are provided for alternatively displaying the three acquired images, one at a time, in imaging optics, and means are provided for alternating according to a desired frequency the display of the acquired images. The term "telescope" is used to designate any optical device or system that can acquire images from a distance. For example, from a flying aircraft a FLIR system comprises a "telescope". It is to be noted that for airborne systems, the aircraft blocks a part of the 360° field of view. For such systems an embodiment of the present invention, which provides a panoramic view of up to 180°, is typically provided. It is understood that light beams transmit the acquired images and the analog signals conveyed by the light beams are transduced to digital signals to define the display of the imaging optics. As is widely practiced in the art, the digital signals may be memorized and/or transmitted to define corresponding displays of different imaging optics and/or at different times.

In a first aspect the present invention provides a panoramic field of view acquiring system. The system comprises three telescopes, an optical multiplexer, a detector, optical elements for focusing and steering the acquired images along optical paths within the system and focusing them on the detector, and means for storing, processing, and displaying the images.

Each of the telescopes has a field of view and acquires an image that is essentially independent from that of the other two telescopes. The optical multiplexer comprises two choppers having optically operative portions that are operated synchronously in order to transmit each of the images acquired by the telescopes separately to the detector. The images are processed and combined to provide a panoramic field of view, which covers a horizontal field of view of up to 360 degrees.

In one embodiment of the invention, each of the three telescopes has essentially the same field of view. In another embodiment of the invention, each of the three telescopes has a field of view of slightly more than 120 degrees and the panoramic view covers a horizontal field of view of 360 degrees. In a different embodiment, each of the three telescopes has a field of view of slightly more than 60 degrees and the panoramic view covers a horizontal field of view of 180 degrees.

The optically operative portions of the choppers are preferably rotating elements that intersect the optical paths. Each of the rotating elements comprises: a central portion, which serves to connect the rotating element to driving means, reflective sections, and transparent sections. The rotating element can be disc shaped or be shaped like a rectangular blade or have any other contour.

In one embodiment of the invention, the rotating elements are comprised of one reflective section and one transparent section, one of which sections angularly extends over 120 degrees and one of which sections angularly extends over 240 degrees. In other embodiments the rotating elements are comprised of two reflective sections and two transparent sections.

According to a preferred embodiment of the invention the rotation of the rotating elements is synchronized by mechanical means. Preferably the mechanical means comprise shafts to which the rotating elements are keyed, the two shafts have mechanically coupled, concurrent drives, so that they are driven concurrently with the same rotary speed, and the rotating elements are keyed to the shafts in appropriate, relative angular positions.

In another aspect the invention provides a method for using the system of the invention for acquiring and displaying a panoramic field of view. The method comprises the following steps:
  acuiring a first, a second and a third image from each of the three telescopes respectively; and
  using a double-chopper multiplexer operating at a frequency of between 30 to 100 Hz to transmit the images periodically, successively, one at a time, to a detector.

In more detail, the method of the invention can be broken down into the following steps:
  acquiring a first, a second and a third image from each of the three telescopes respectively;
  transmitting the first and the second image to a first chopper of the optical multiplexer;
  alternatively, effecting a first selection between the first and the second image;
  transmitting the firstly selected image and the third image to the second chopper of the optical multiplexer;
  alternatively effecting a second selection between the firstly selected image and the third image; and
  transmitting the secondly selected image to the detector;
  transmitting the detected image to the means for storing, processing, and displaying the image; and
  processing and combining the images to provide the panoramic field of view

DETAILED DESCRIPTION

The present invention is a system comprised of three telescopes 2, 4, 6 (see FIG. 1 and FIG. 6), which acquire three separate images, each typically covering a little over one third of the total required scene and a multiplexer 10, which is used to transmit the three images, one at a time, to an appropriate detector 8. The images are transmitted from detector 8 either wirelessly or via cable 52 to means 50 for storing, processing, and displaying them. Standard imaging techniques are then used to coordinate the images to form a complete picture and display them as required. It should be understood that in the currently described embodiments, the three telescopes have essentially equal fields-of-view and none of them is preferred in any way over the others. However, in other embodiments, they might have different fields-of-view.

Figure 1:
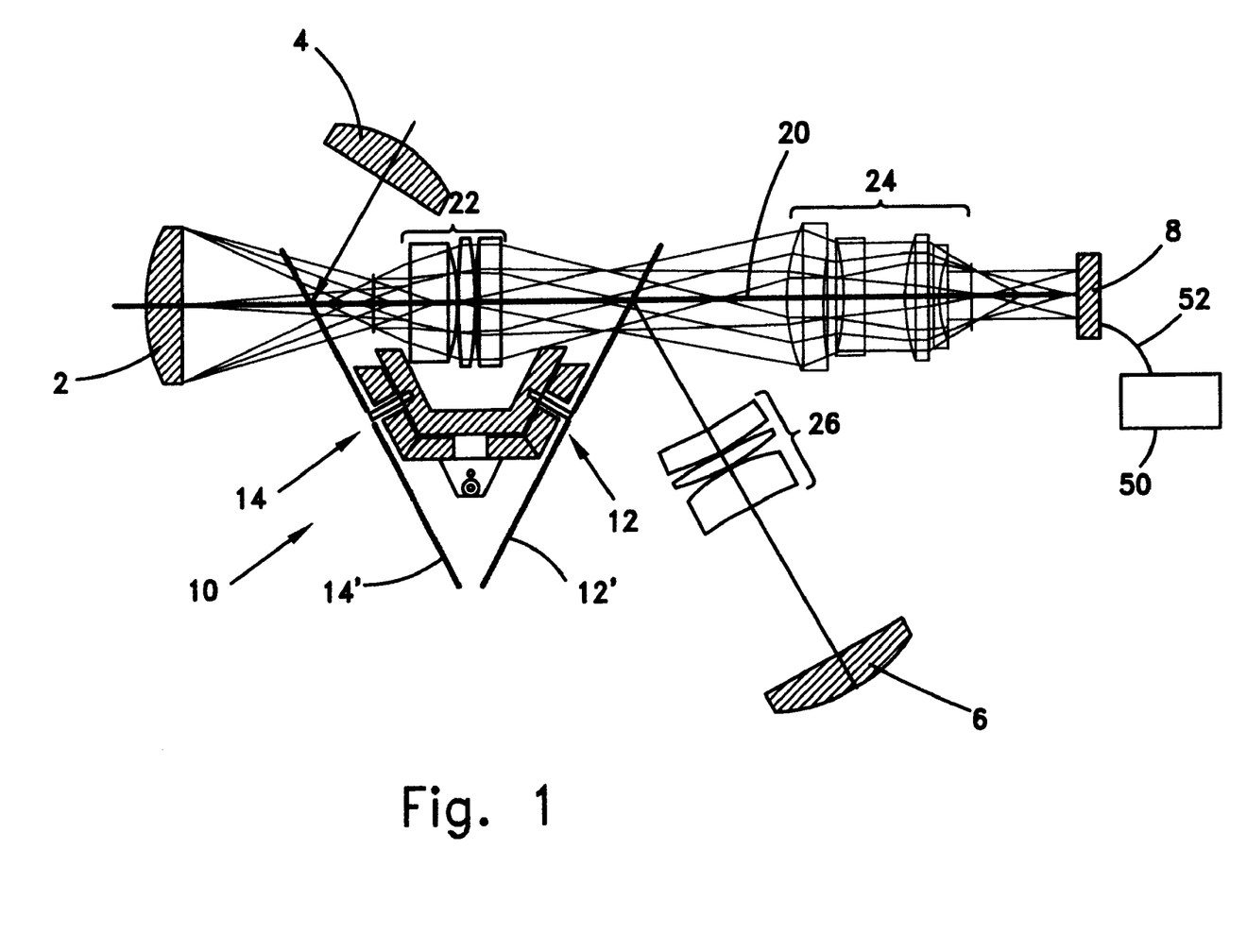
FIG. 1 is a schematic representation of a system that provides a combined field of view of 360° according to an embodiment of the invention.

FIG. 1 schematically represents an example of a system according to the invention, which could be mounted on an armored vehicle or a ground station. Numerals 2, 4, and 6 indicate respectively a first, a second and a third telescope, and numeral 8 indicates a detector. Each telescope has a field of view of slightly more than 120 degrees. The telescopes are arranged with an angle of 120 degrees between their principal axes, such that combining the three images results in a 360 degree panoramic view of the scene surrounding the system.

Numeral 10 indicates an optical multiplexer comprised of two choppers 12 and 14. Numeral 12' indicates the optically operative portion of chopper 12 and numeral 14' indicates the optically operative portion of chopper 14. By "optically operative portion" is meant the portion of the chopper on which impinge or may impinge the light beams. The multiplexer is intended to select between the impinging beams.

In the preferred embodiments of the invention, the optically operative portions of the choppers are rotating elements that intersect the optical paths and comprise both reflective and transparent sections. Generally, the central portion of the rotating element serves to connect it to the driving means and need not be either transparent or reflective. The optically operative portion is typically annular and surrounds said central portion. The reflective portions needs to be reflective only on one side and the other side, which is used only to block the beam, therefore is not necessarily reflective. In the preferred embodiments, both of the rotating elements are identical, however it is also possible to use disks having different configurations.

In addition to choppers comprising rotating elements, choppers having other embodiments are known in the art, for example, vibrating "tuning fork" choppers or choppers comprised of materials that can switch between a solid reflective state and a translucent state as a result of their photochromic or thermochromic properties can be adapted to satisfy the requirements of the invention. The only requirement being that the change from reflective to transparent state of both choppers is synchronized as described hereinbelow such that the images from the three telescopes fall alternately upon the detector.

Figure 2A:
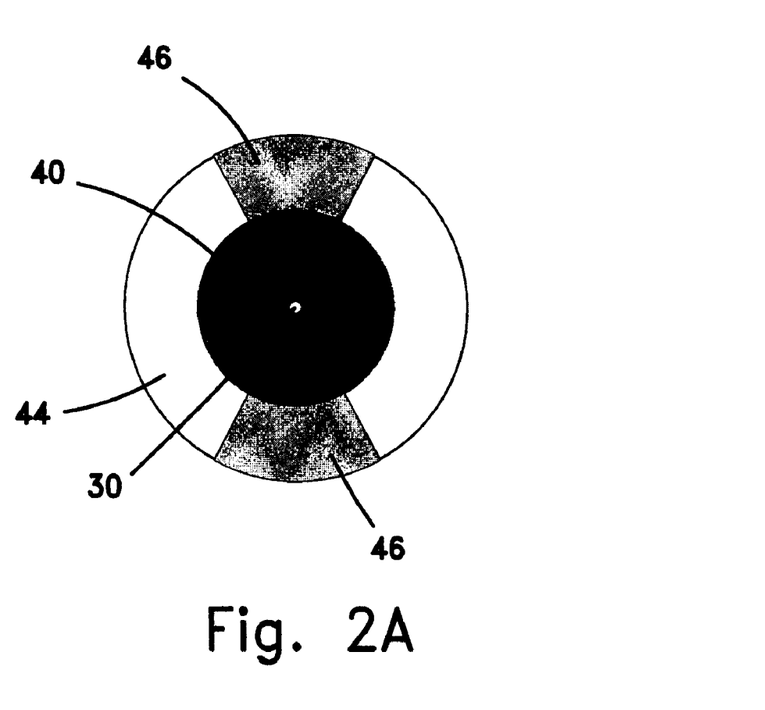
FIGS. 2A and 2B schematically show preferred embodiments of the rotating elements of the choppers.

In FIG. 2A is schematically shown a preferred embodiment in which the rotating element is a disc known as a chopper wheel. The disc is made of a material that is optically transparent to the wavelength of light in which the system works. For example the disc could be glass for the visible region and sapphire for systems that work in the near infrared. The chopper wheel has a central hole 30 for mounting the wheel on the shaft of a drive system that causes it to rotate about the axis of the shaft, an optically inactive section 40, transparent sections 44, and two symmetrically positioned and shaped reflective sections 46, which can be formed by depositing a reflective coating on its surface.

Figure 2B:
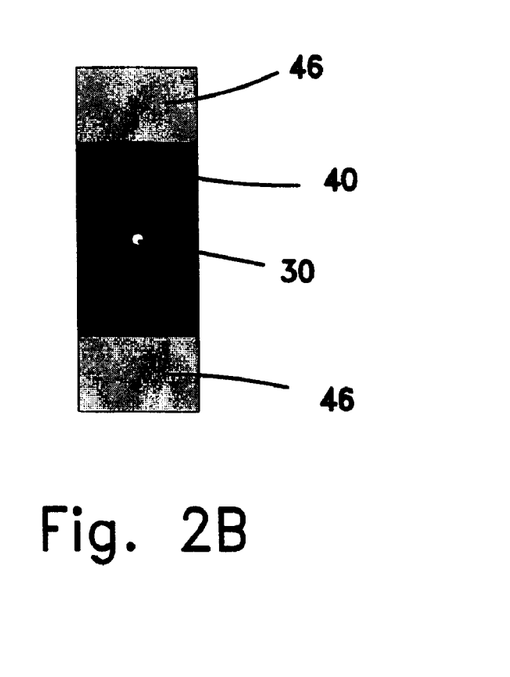

According to the presently preferred embodiment of the invention, both of the chopper wheels are identical; however embodiments can be devised in which the two wheels are different. In FIG. 2B is schematically shown an embodiment of a chopper wheel similar to that shown in FIG. 2A in which the transparent sections have been removed resulting in a rectangular blade having two symmetrically placed reflective sections 46 on its two ends. In other embodiments the removed sections can have other shapes resulting in any desired contour for the chopper blade. This embodiment is preferred for many applications since it has the advantages of being lighter in weight than the wheel, can be made entirely of opaque material such as aluminum or other suitable metal, is much more resilient and less expensive than, for example, sapphire.

In the preferred embodiments, the two choppers rotate synchronously in typically opposite directions in order to partially balance the gyroscopic moments. Optionally the same multiplexing effect can be obtained by rotating the choppers in the same direction.

FIG. 3 and FIGS. 4A to 4C schematically summarize the way in which the choppers of the multiplexer must be synchronized in order to allow the images acquired by the three telescopes to be sequentially allowed to impinge on the face of the detector.

Figure 3:
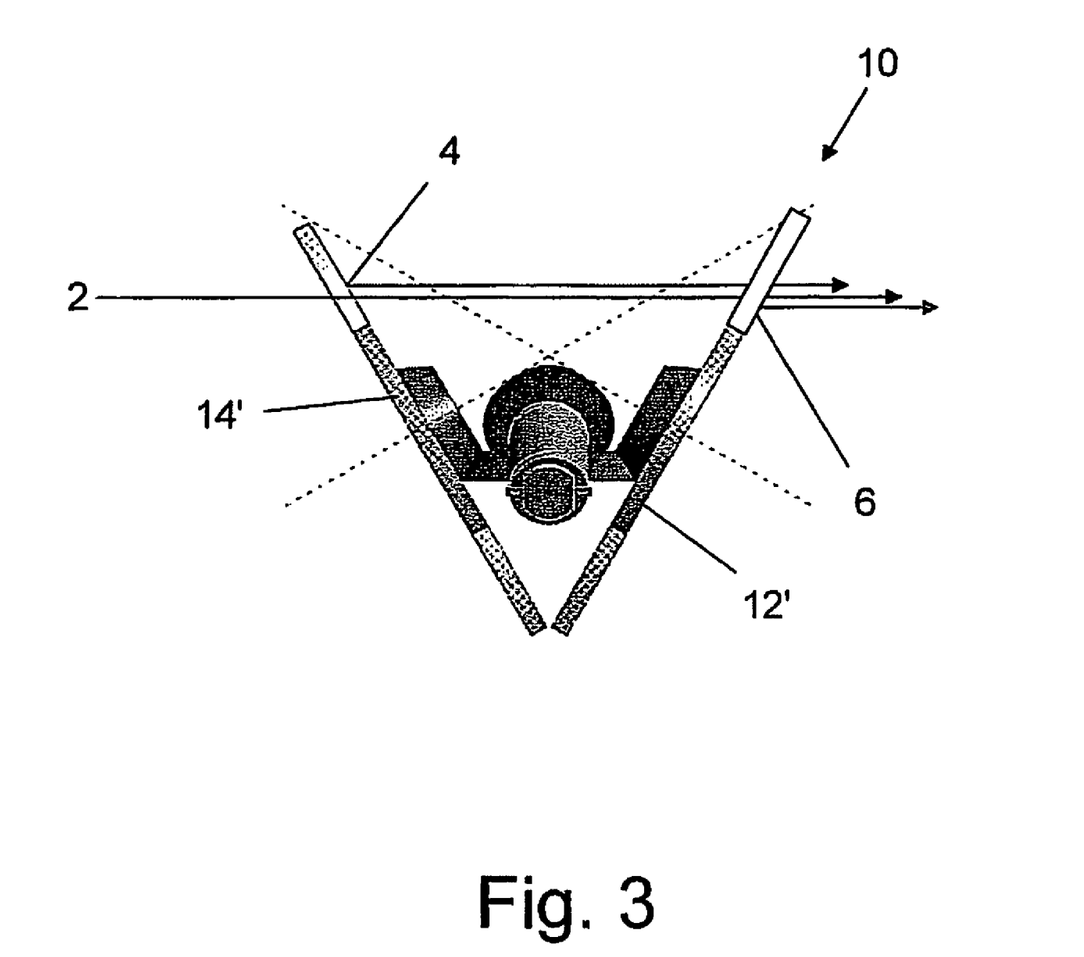
FIG. 3 schematically shows the way in which a typical ray from each of the telescopes must interact with the optically active portion of the choppers in order to reach the detector.

FIG. 3 schematically shows the way in which a typical ray from each of the telescopes must interact with the choppers of the multiplexer in order to reach the detector.

Figure 4A:
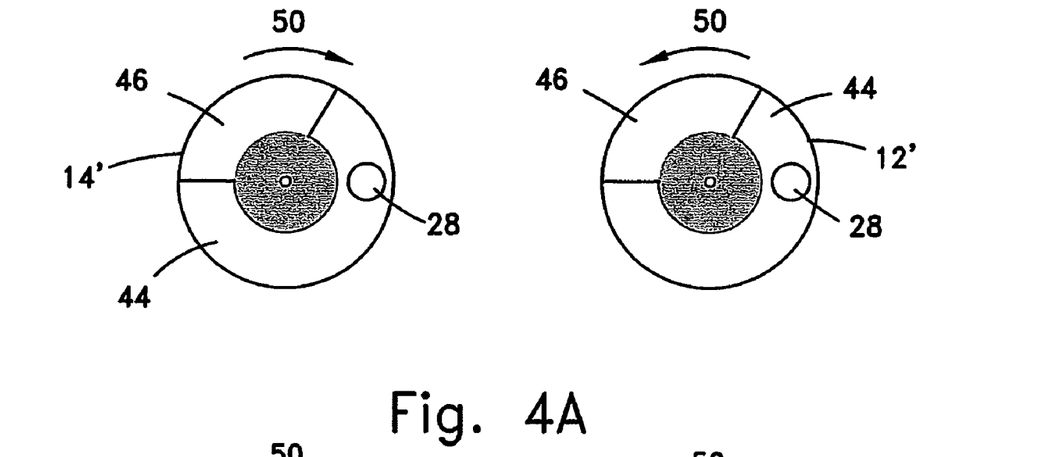
FIGS. 4A to 4C show the rotational position of the optically active portion of the choppers in order to allow the image from each of the telescopes to reach the detector.
Figure 4B:
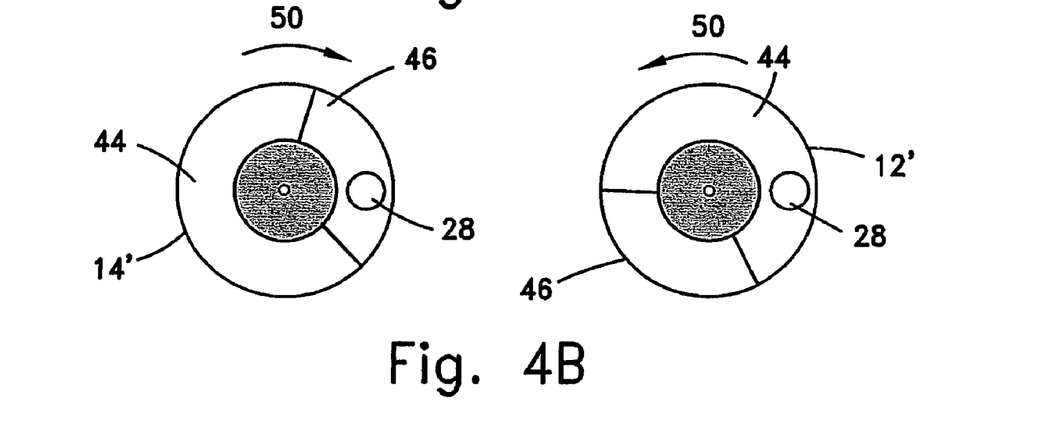
Figure 4C:
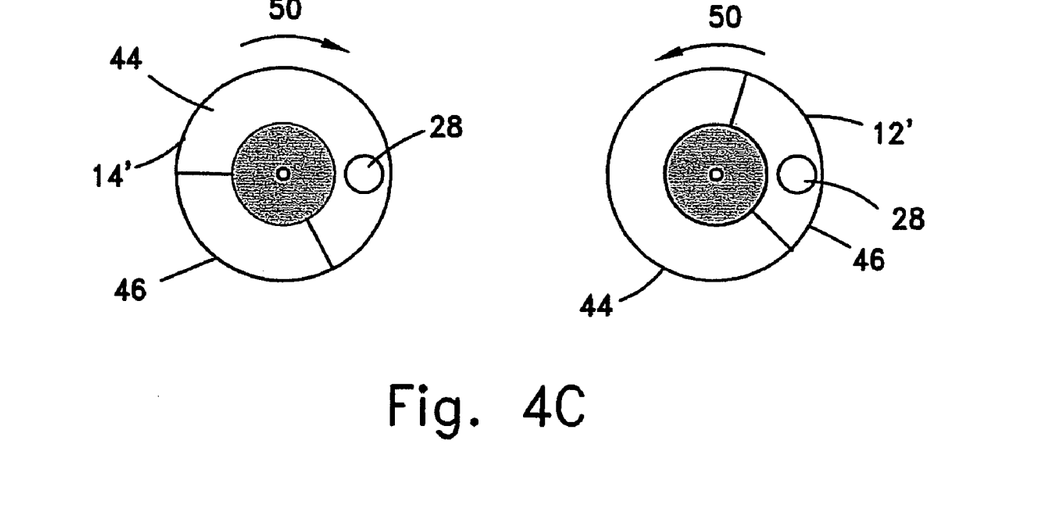

FIGS. 4A to 4C show typical rotational positions of the two chopper wheels at which the image gathered by each of telescopes 2, 4, and 6 respectively is directed, by the multiplexer to the detector. In FIGS. 4A to 4C, the multiplexer comprises two choppers with identical wheels. The left wheel presents a typical position of chopper wheel 14', while the right wheel shows the synchronized position of chopper wheel 12'. The circles 28 represent the face of the sensor. This is equivalent to the location at which the primary optical axis of the system passes through the rotating wheel at the instant of time shown in the figure. The chopping wheels rotate synchronously in opposite directions indicated by the curved arrow 50 in the figures and pass repeatedly through three mutually combined positions that transmit one of the 3 images at a time to the sensor, while blocking the others as required. Beams 2, 4, and 6 shown in FIG. 3 are transmitted to the detector 8 at the positions shown in FIGS. 4A, 4B, and 4C respectively.

If the optically operative portions of the choppers are on rotating elements, their synchronization may be accomplished by simple mechanical means. If each rotating element is keyed to a shaft and the two shafts have mechanically coupled drives, so that they are driven concurrently with the same rotary speed, it is sufficient to mount the rotating elements in appropriate, relative angular positions on the respective shafts to assure their permanent synchronization.

Figure 5:
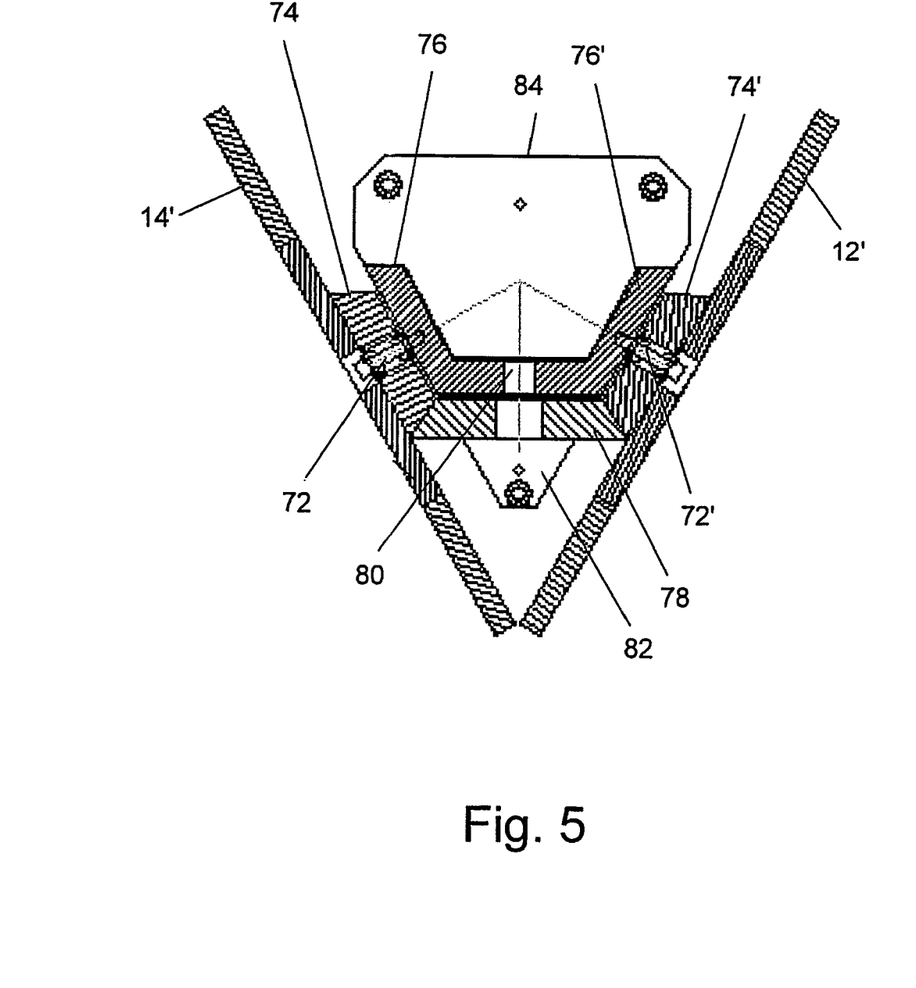
FIG. 5 is a schematic illustration of a multiplexer drive and synchronization mechanism, according to an embodiment of the invention.

FIG. 5 is a plan cross-sectional view, which schematically illustrates an embodiment of the manner in which the two chopper wheels (or rectangular metal choppers as shown in FIG. 2B) are driven and mechanically synchronized. Chopper wheel 14' and conical gear 74 are keyed to shaft 72 and chopper wheel 12' and conical gear 74' are keyed to shaft 72'. Both of the shafts are conveniently mounted on static supports, schematically indicated at 76 and 76' which may comprise ball bearings or other suitable arrangements about which the shafts are free to rotate. Gears 74 and 74' mesh with a common, conical drive gear 78, keyed to shaft 80 of motor 82. Motor 82 and static supports 76 and 76' are rigidly attached to bracket 84, which is used to attach the multiplexer to the remainder of the optical system. The above, however, is only an example, and expert persons could devise many other ways of synchronization. By appropriate design of the gears, the two chopper wheels can be made to turn in the same or in opposite directions and their synchronization therefore assured by the above arrangement.

The speed of rotation of the chopper wheels determines the frequency with which the images acquired by any one of the telescopes fall on the detector. The frequency is limited by the detector specifications, specifically the integration time, i.e. the time span required to record (sample) an image onto the detector's pixels matrices (typically 2 milliseconds) and the download time, i.e. the time span required to move the pixels information into a buffer (typically 5 milliseconds). The frequency must also be such that the system meets operational/mission goals. Preferably, the frequency is between 30 and 100 Hz. The images can be processed, improved and shown in many ways, known to persons skilled in the art. The images, of course, could be registered. A particular zone might be viewed at an enlargement, or its changes and evolution could be analyzed by viewing a succession of images of said zones taken at different times.

A typical system according to the invention comprising the three telescopes, multiplexer, and optics has a general size of 160×240×240 mm and an inclusive weight is 4 Kg.

Referring now to FIG. 1 the operation of the system will be explained in detail. In FIG. 1, telescope 2 transmits the acquired image along axis 20 towards detector 8. If chopper wheel 14' is in such a position that axis 20 impinges on its transparent section, then the image acquired by telescope 4 passes through the chopper wheel and is absorbed by conventional means or otherwise neglected and the image acquired by telescope 2 is focused by optics, generally indicated at 22, along axis 20 onto chopper wheel 12'. If chopper wheel 12' is in such a position that axis 20 impinges on its transparent section, then the image acquired by telescope 6 passes through the chopper wheel and is absorbed by conventional means or otherwise neglected and the image acquired by telescope 2 is focused by optics generally indicated at 24, along axis 20 onto detector 8.

When chopper wheel 14' is in such a position that axis 20 impinges on its reflective section, the image acquired by telescope 2 is obstructed by the chopper wheel and is absorbed by conventional means or otherwise neglected. The image acquired by telescope 4 is reflected along axis 20. If chopper wheel 12' is in such a position that axis 20 impinges on its transparent section, then the image acquired by telescope 4, and reflected from chopper wheel 14', is focused by optics generally indicated at 24 along axis 20 onto detector 8. Concurrently, the image acquired by telescope 6 passes through the transparent section of chopper wheel 12' and is absorbed by conventional means or otherwise neglected.

When a beam of light parallel to axis 20 impinges on the reflective section of chopper wheel 12 it is irrelevant whether the image acquired by telescope 2 or the image acquired by telescope 4 has been focused by optics 22 onto chopper wheel 12', since either image will be blocked by chopper wheel 12' and will be absorbed by conventional means or otherwise neglected. Concurrently, the image acquired by telescope 6 is focused by optics, generally indicated at 26 onto chopper wheel 12' and is reflected along axis 20 and focused by optics 24 onto detector 8.

Figure 6:
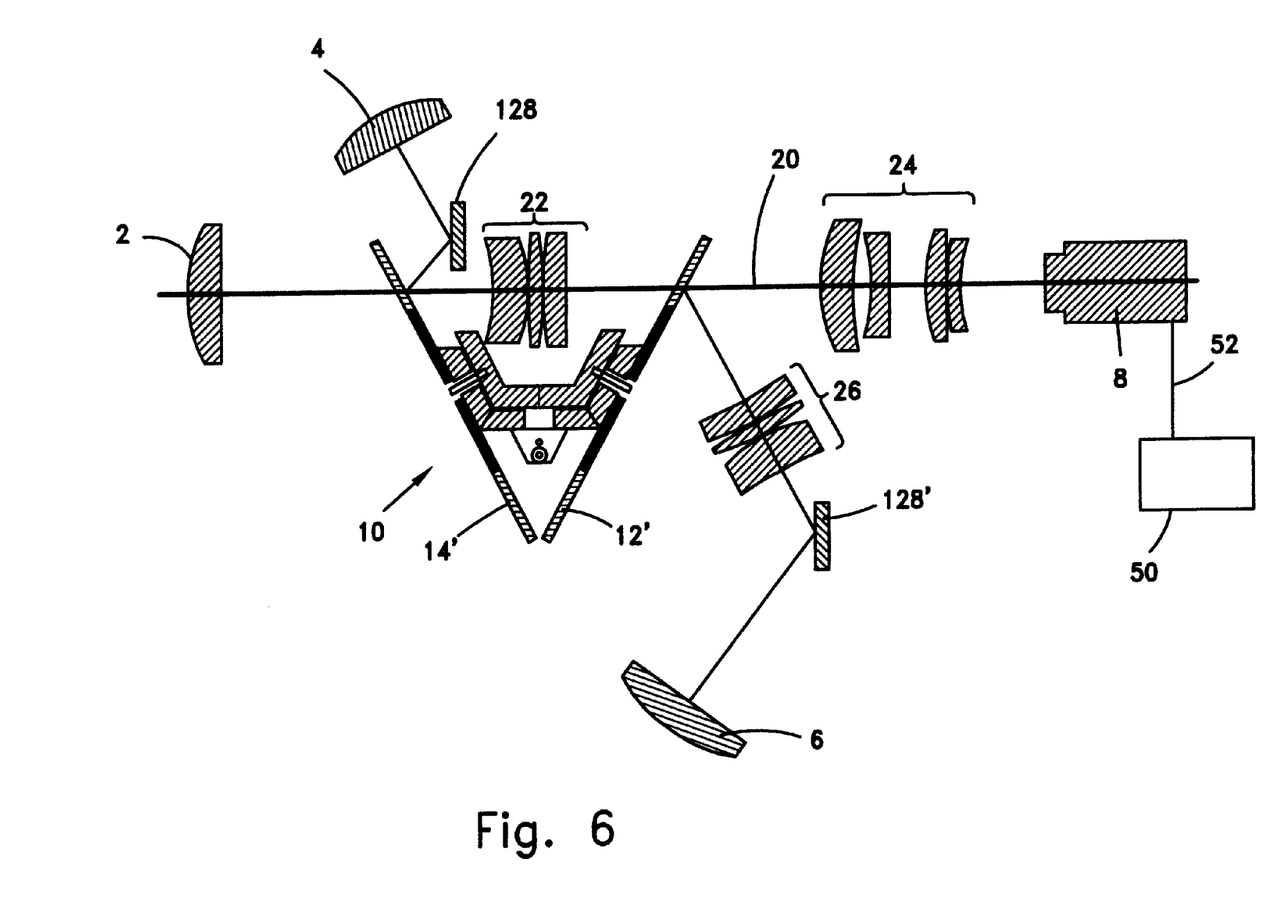
FIG. 6 is a schematic representation of a system that provides a combined field of view of 180° according to another embodiment of the invention.

FIG. 6 shows an embodiment of the system that has been designed to acquire a panoramic view of approximately 180 degrees. The optical arrangement is similar to that shown in FIG. 1 and described hereinabove. The difference being that, in the embodiment of FIG. 6, each telescope has a field of view of slightly more than 60 degrees and the telescopes are arranged with an angle of 60 degrees between their principal axes, such that combining the three images results in a 180 degree panoramic view of the scene surrounding the system. In the system shown in FIG. 6 additional "steering" optical elements 128 and 128' must be included to direct the images collected by telescopes 4 and 6 to the detector 8.

It will be appreciated by skilled persons that the optical elements designated by numerals 22, 24, 26, 128 and 128' in the figures are shown only schematically and can constitute either single elements or groups of elements comprising refractive or reflective surfaces. Also included may be other items known in the art, such as slits or baffles to limit unwanted internal reflections of the beams. The exact optical design being dependent on the conditions under which the system of the invention is to be operated. Similarly the methods of storing, processing, and displaying the images that are transmitted to the detector are well known in the art and need not be described herein.

While embodiments of the invention have been described for purposes of illustration, it will be understood that the invention may be implemented with many variations, modifications and adaptation, without departing from its scope as defined in the claims.

The present invention is not to be limited in scope by the specific embodiments described herein. Indeed, various modifications of the invention in addition to those described herein will become apparent to those skilled in the art from the foregoing description and accompanying Figures. Such modifications are intended to fall within the scope of the appended claims. Various references are cited herein, the disclosure of which are incorporated by reference in their entireties.

The invention claimed is:

1. A panoramic field of view acquiring system comprising:
   three telescopes, each of said telescopes having a field of view and acquiring an image that is essentially independent of that of the other two of said telescopes;
   an optical multiplexer;
   a detector;
   optical elements for focusing and steering said acquired images along optical paths within said system such that said acquired images are focused on said detector; and
   means for storing, processing, and displaying said images;
wherein, said optical multiplexer comprises two choppers having optically operative portions that are operated synchronously in order to transmit each of said images acquired by said telescopes separately to said detector and said images are processed and combined to provide said panoramic field of view and said panoramic view covers a horizontal field of view of up to 360 degrees.

2. The system according to claim 1, wherein each of the three telescopes has essentially the same field of view.

3. The system according to claim 2, wherein each of the three telescopes has a different field of view of slightly more than 120 degrees and is oriented to a different direction and the panoramic view covers a horizontal field of view of 360 degrees.

4. The system according to claim 2, wherein each of the three telescopes has a different field of view of slightly more than 60 degrees and is oriented to a different direction and the panoramic view covers a horizontal field of view of 180 degrees.

5. The system according to claim 1, wherein the optically operative portions of the choppers are rotating elements that intersect the optical paths, each of said rotating elements comprising:
   reflective sections;
   transparent sections; and
   a central portion, which serves to connect said rotating element to driving means.

6. The system according to claim 5, wherein each of the rotating element is selected from elements having the following shapes:
   disc shape;
   rectangular blade shape; and
   blade shape having any contour other than rectangular.

7. The system according to claim 5, wherein each of the rotating elements comprises one reflective section and one transparent section, one of which sections angularly extends over 120 degrees and one of which sections angularly extends over 240 degrees.

8. The A system according to claim 5, wherein each of the rotating elements comprises two reflective sections and two transparent sections.

9. The system according to claim 5, wherein the rotation of each of the rotating elements is synchronized by mechanical means.

10. The system according to claim 9, wherein the mechanical means comprise two shafts to which the rotating elements are keyed, the two shafts have mechanically coupled, concurrent drives, so that they are driven concurrently with the same rotary speed, and the rotating elements are keyed to the shafts in appropriate, relative angular positions.

11. The method of using the system of claim 1 for acquiring and displaying a panoramic field of view comprising the following steps:
   acquiring a first, a second and a third image from each of the three telescopes respectively; and
   Using a double-chopper multiplexer to transmit said images periodically, successively, one at a time, to the detector;
wherein, the frequency of the multiplexer is between 30 to 100 Hz.

12. The method of using the system of claim 1 for acquiring and displaying a panoramic field of view comprising the following steps:
   acquiring a first, a second and a third image from each of the three telescopes respectively;
   transmitting said first and said second images to a first chopper of the optical multiplexer;
   alternatively, effecting a first selection between said first and said second images;
   transmitting the firstly selected image and said third image to the second chopper of said optical multiplexer;

alternatively effecting a second selection between said firstly selected image and said third image; and
transmitting the secondly selected image to the detector;
transmitting said detected image to the means for storing, processing, and displaying said detected image; and processing and combining said detected images to provide said panoramic field of view.

* * * * *